(12) United States Patent
Eggers et al.

(10) Patent No.: US 6,633,103 B2
(45) Date of Patent: Oct. 14, 2003

(54) DEVICE WITH A STATOR AND A SLEEVE

(75) Inventors: Wolf Joachim Eggers, Lübeck (DE); Johannes Pfetzer, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/030,835

(22) PCT Filed: May 23, 2001

(86) PCT No.: PCT/DE01/01934
§ 371 (c)(1),
(2), (4) Date: Jan. 10, 2002

(87) PCT Pub. No.: WO01/91267
PCT Pub. Date: Nov. 29, 2001

(65) Prior Publication Data
US 2003/0006664 A1 Jan. 9, 2003

(30) Foreign Application Priority Data
May 25, 2000 (DE) .......................................... 100 26 009

(51) Int. Cl.$^7$ ................................................ H02K 1/00
(52) U.S. Cl. ........................ 310/216; 310/218; 310/258
(58) Field of Search ................................. 310/216, 217, 310/218, 43, 89, 254, 258, 259

(56) References Cited

U.S. PATENT DOCUMENTS

| 3,866,071 | A | * | 2/1975 | Hallerback | 310/43 |
| 3,914,859 | A | * | 10/1975 | Pierson | 29/596 |
| 4,140,935 | A | * | 2/1979 | Braun et al. | 310/224 |
| 4,439,703 | A | * | 3/1984 | Kohzai et al. | 310/186 |
| 4,698,539 | A | * | 10/1987 | Workman | 310/216 |
| 4,719,382 | A | * | 1/1988 | Listing | 310/187 |
| 4,835,839 | A | * | 6/1989 | Forbes et al. | 29/596 |

FOREIGN PATENT DOCUMENTS

| DE | 37 16 771 A | 12/1988 |
| DE | 39 05 997 A | 8/1990 |
| EP | 0 855 511 A | 7/1998 |
| FR | 2 579 841 A | 10/1986 |
| FR | 2 726 700 | 5/1996 |
| GB | 1 401 243 | 7/1975 |
| GB | 2 303 744 A | 2/1997 |

* cited by examiner

Primary Examiner—Thanh Lam
(74) Attorney, Agent, or Firm—Michael J. Striker

(57) ABSTRACT

A stator (1) and sleeve (5) are secured to one another by means of nonpositive engagement in the form of a bayonet mount (30). The apparatus is employed in particular in electric motors.

8 Claims, 3 Drawing Sheets

DEVICE WITH A STATOR AND A SLEEVE

BACKGROUND OF THE INVENTION

The invention is based on an apparatus with a stator and a sleeve.

From British Patent Disclosure GB 2303744 A1 or GB 1401234 A1, it is already known for a stator to be secured in a housing by means of a heat fit or shrink fit. However, this method is complicated since the housing has to be heated, and during use the combination of stator and housing can come loose again during heating of the housing.

French Patent Disclosure FR 2726700 A1 already shows how a bayonet mount is used to secure a brush holder housing to a stator. However, this brush holder housing does not surround the stator.

From U.S. Pat. No. 4,992,686, it is also known for a stator to be secured in the axial direction in a housing by means of a bayonet mount. However, the bayonet mount is not formed here by the outer housing and stator but rather by an additional element and the housing. This additional element is forced into the housing and rotated therein and thereby secures the stator in the housing.

SUMMARY OF THE INVENTION

The apparatus of the invention with a stator and a sleeve has the advantage over the prior art that a sleeve can be secured to a stator in a simple way.

One advantageous embodiment of a bayonet mount is that the bayonet mount is formed by nonpositive engagement.

For the magnetic properties of the stator, it is advantageous if the stator comprises at least one lamination packet.

It can be equally advantageous for the magnetic properties of the sleeve if the sleeve comprises at least one lamination packet.

An advantageous use of the sleeve is that it form a magnetic short-circuit element.

It is also advantageous if the stator has an at least partly present plastic sheath, which can also form a bayonet mount with the sleeve.

BRIEF DESCRIPTION OF THE DRAWINGS

One exemplary embodiment of the invention is shown in simplified form in the drawing and described in further detail in the ensuing description.

Shown are

DETAILED DESCRIPTION OF THE PREFERRED EMBODIMENTS

Figure 1:
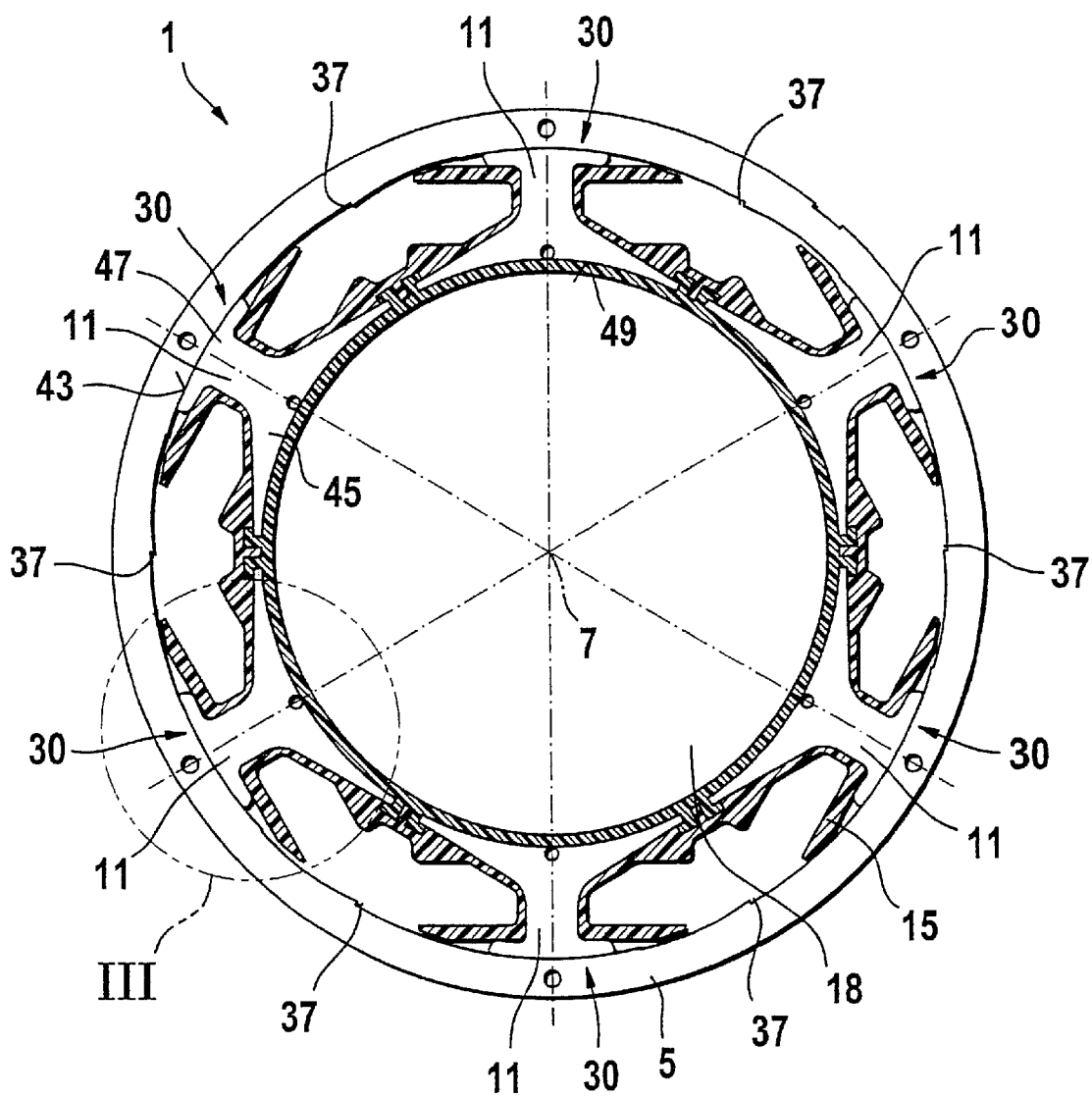
FIG. 1, an apparatus according to the invention, with a stator and a sleeve.

FIG. 1 shows an apparatus having a stator 1 embodied according to the invention and a sleeve 5 embodied according to the invention, of the kind used for instance in an electric motor.

The apparatus with the stator 1 and sleeve 5 has a center axis 7. Stator pole teeth 11, for instance six of them, are distributed, uniformly for example, about the center axis 7. The stator 1 can comprise a solid material or can for instance comprise a lamination packet that is formed of at least one lamination.

In this exemplary embodiment, each stator pole tooth 11 forms one lamination packet; that is, there are six separate lamination packets, which are connected as individual stator pole teeth 11 to one another in a non-magnetically conductive fashion.

The stator 1 has a plastic sheath 15, which for instance is at least partially present and which in this exemplary embodiment carries and holds together the individual stator pole teeth 11. If the stator 1, which has magnetically conductively connected stator teeth 11, comprises a lamination packet or a solid material, then nevertheless a plastic sheath may be present, for instance to protect the stator 1 against corrosion or to form a waterproof inner conduit 18. The sleeve 5 can likewise comprise solid material or at least one lamination packet. If the sleeve 5 comprises a soft magnetic material, it can also act as a magnetic short-circuit element. A rotor (not shown) is for instance disposed around the center axis 7 and together with the stator 1, among other elements, forms an electric motor. Such a rotor is shown for instance in GB 2303744 A1.

Figure 2:
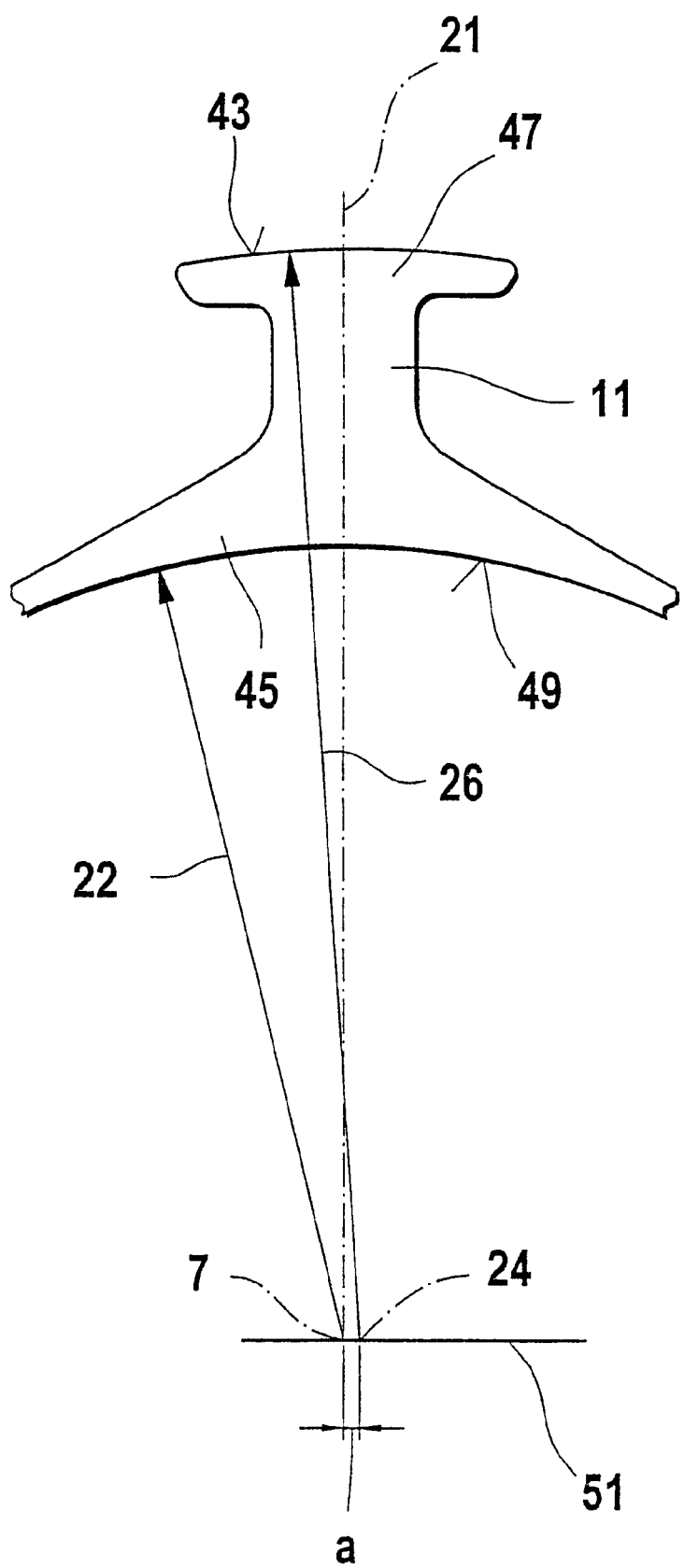
FIG. 2, a stator pole tooth.

FIG. 2 shows a stator pole tooth 11. The stator pole tooth 11 has a pole foot 45, a pole head 47, and a pole tooth axis 21, which passes through the center axis 7. An inner radius 22, forming a inner face 49 of the pole foot 45 of the stator pole tooth 11, this foot being embodied in curved fashion, likewise passes through the center axis 7. An outer radius 26 on the pole head 47, also embodied in curved fashion, of the stator pole tooth 11 extends from an offset axis 24 that extends parallel to the center axis 7. The offset axis 24 is offset from the center axis 7 by a spacing a, for instance along a line 51 extending perpendicular to the pole tooth axis 21 and in the plane of the drawing. On each pole head 47 of the stator pole teeth 11, this creates curved outer faces 43, which are offset from the inner face 49 of the pole foot and to which the sleeve 5 can be joined with play in a rotated position. If the sleeve 5 is then rotated relative to the stator pole teeth 11, then as a consequence of positive engagement, the sleeve 5 becomes wedged at the stator pole teeth 11, which has the effect of a bayonet mount 30, thereby compensating for slight production variations.

Figure 3A:
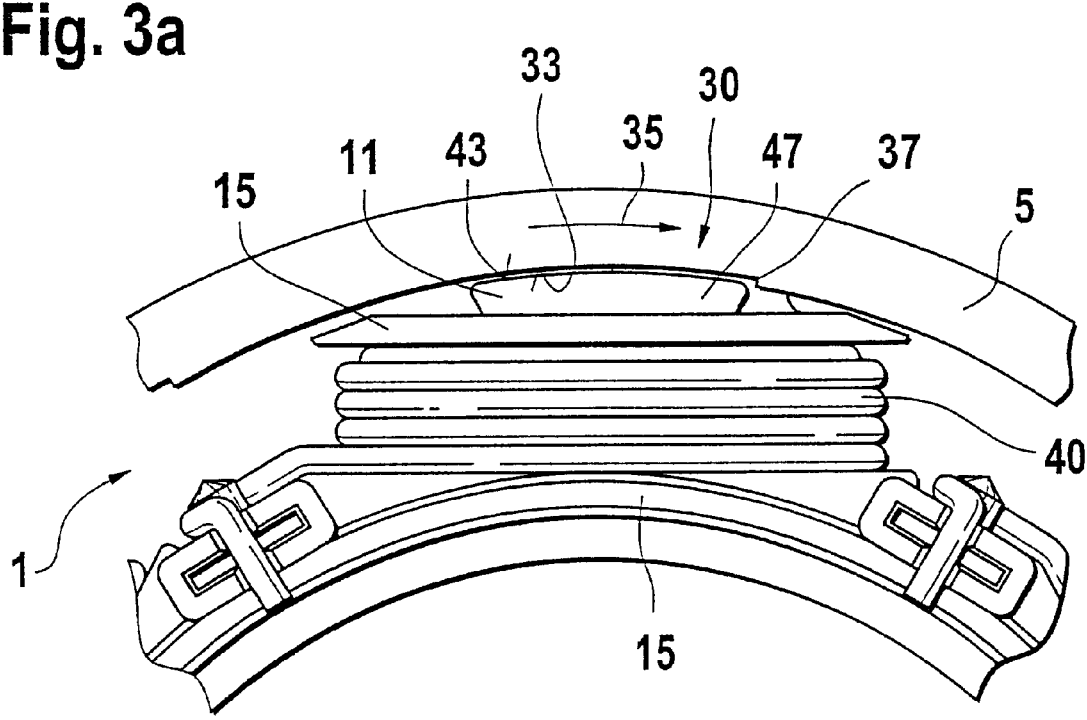
FIGS. 3a and 3b, a detail of the apparatus of FIG. 1 with a stator and a sleeve, in the open and closed state of a bayonet mount.
Figure 3B:
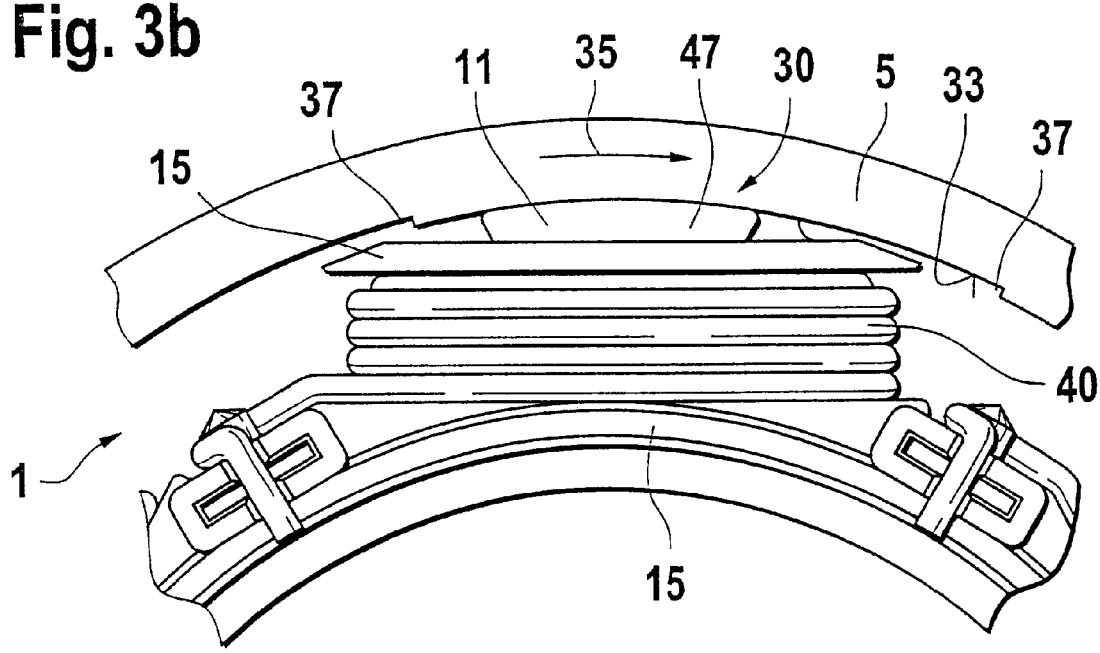

FIG. 3a shows a stator 1 with a sleeve 5 in a position of the bayonet mount 30 in the open state, and FIG. 3b shows it in a position of the bayonet mount 30 in the closed state.

The sleeve 5 has at least one shoulder 37, for instance on its inner face 33. There are repeated shoulders 37, spaced apart uniformly in the direction of revolution on the inner face 33 of the sleeve 5 and corresponding in number to the number of stator pole teeth, for instance. The inner face 33 of the sleeve 5 is embodied in the vicinity of each shoulder 37 in such a way that the spacing from the center axis 7 suffices for the sleeve 5 in this position to be thrust over the stator 1 with its stator pole teeth 11. In a direction of revolution that is opposite from what is shown here as a clockwise closing direction 35, the inner face 33 is embodied such that its spacing from the center axis 7 decreases, so that when the sleeve 5 is rotated in the closing direction 35, the sleeve 5 wedges with at least one stator pole tooth 11, or with the plastic sheath that extends as far as the pole head 47, and enters into nonpositive engagement, thereby forming a bayonet mount 30.

It is not necessary that every stator pole tooth 11 come into contact with the sleeve 5 to form a bayonet mount 30.

The plastic sheath 15 can also be embodied in such a way that it forms the bayonet mount 30 with the sleeve 5, and/or it can also be shaped as a coil body, for instance, for a coil 40.

What is claimed is:

1. An apparatus with a stator and with a sleeve resting at least in part on the stator for an electric motor, characterized in that the sleeve and the stator together form a bayonet mount, said sleeve being rotatable relative to said stator in a predetermined direction to convert said bayonet mount from said open state to said closed state, said stator having a plurality of stator pole teeth, said sleeve having a plurality of inner shoulders and an inner face located in a vicinity of each of said shoulders and formed so that in a direction of revolution which is opposite to said predetermined direction a spacing of said inner face from a center axis of the apparatus decreases, so that when said sleeve is rotated in said predetermined direction, said sleeve wedges with at least one of said stator pole teeth.

2. The apparatus of claim 1, characterized in that the bayonet mount (30) is formed by nonpositive engagement.

3. The apparatus of claim 1, characterized in that the stator (1) has at least one stator pole tooth (11), and that the at least one stator pole tooth (11) has a curved outer face (43), whose outside radius (26) is spaced apart from a center axis (7) of the sleeve (5).

4. The apparatus of claim 1, characterized in that the sleeve (5) has a center axis (7) and an inner face (33) with at least one shoulder (37), and beginning at the shoulder (37), a spacing between the inner face (33) and the center axis (7) decreases in one circumferential direction and increases in the opposite circumferential direction of the sleeve (5).

5. The apparatus of claim 1, characterized in that the stator (1) comprises at least one lamination packet.

6. The apparatus of claim 1, characterized in that the sleeve (5) is a magnetic short-circuit element.

7. The apparatus of claim 1, characterized in that the sleeve (5) comprises at least one lamination packet.

8. The apparatus of claim 1, characterized in that the stator (1) has an at least partly present plastic sheath (15).

* * * * *